Aug. 5, 1924.

W. J. STOOP

1,503,670

SHEET BAR HANDLING MECHANISM

Filed May 13, 1922    11 Sheets-Sheet 2

Inventor
W. J. Stoop.
By
Attorney

Patented Aug. 5, 1924.

1,503,670

UNITED STATES PATENT OFFICE.

WILLIAM J. STOOP, OF WHEELING, WEST VIRGINIA.

SHEET-BAR-HANDLING MECHANISM.

Application filed May 13, 1922. Serial No. 560,587.

*To all whom it may concern:*

Be it known that I, WILLIAM J. STOOP, a citizen of the United States of America, and resident of Wheeling, county of Ohio, and State of West Virginia, have invented certain new and useful Improvements in Sheet-Bar Handling Mechanisms, of which the following is a specification.

This invention relates broadly to sheet-bar handling mechanism, and it has for its primary object to provide mechanical means whereby sheet bars as they come from the finishing mills are expeditiously handled for effecting cooling thereof and, following cooling, are transported to a position convenient for storage, thereby effectively eliminating the very great congestion of mill floor space which is incident to handling such bars by existing methods.

A further object is to provide sheet-bar handling apparatus by means of which the bars are handled individually and in succession at the maximum speed of which a mill is capable, thus not only avoiding the congestion of space referred to, but also providing for a very material increase in the capacity of the mill.

A still further object is to provide an apparatus of the character mentioned which is wholly automatic in its operation and by which is eliminated manual handling of the bars from the time they are delivered from the finishing rolls until they arrive individually in cooled condition at a place for storage.

With these and other objects in view, the invention resides in the features of construction and arrangement which will hereinafter be fully described, reference being had to the accompanying drawings, in which—

Figure 4 is an enlarged side elevation of an intermediate portion of a conveyor of the cooling bed;

Figure 6 is a sectional elevation of the carrying-off table and the delivery end of the mechanism of the cooling bed;

Figures 1, 17, 18, 19:
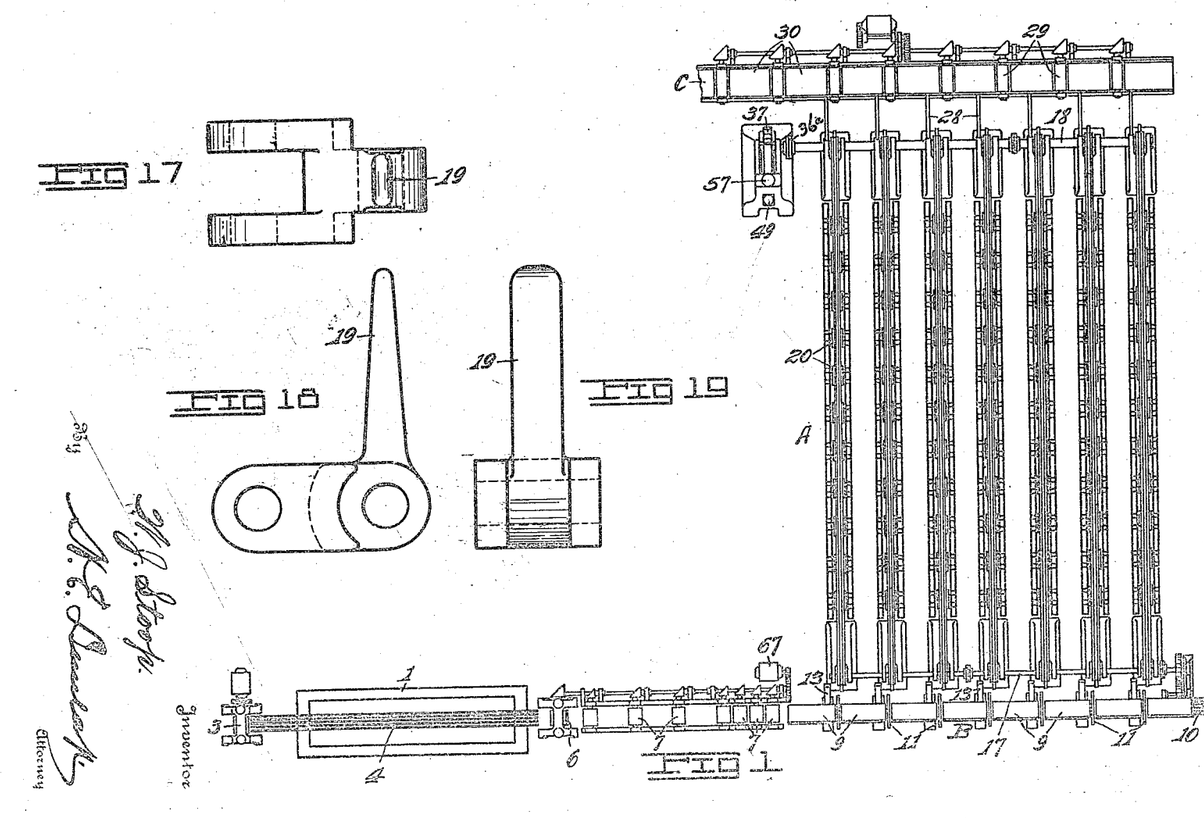
Figure 1 is a diagrammatic top plan view of the invention.
Figure 17 is an enlarged detail view in top plan of a link of a conveyor chain; and—
Figures 18 and 19 are, respectively, side and front end elevations of the same.
Figures 8, 9, 10:
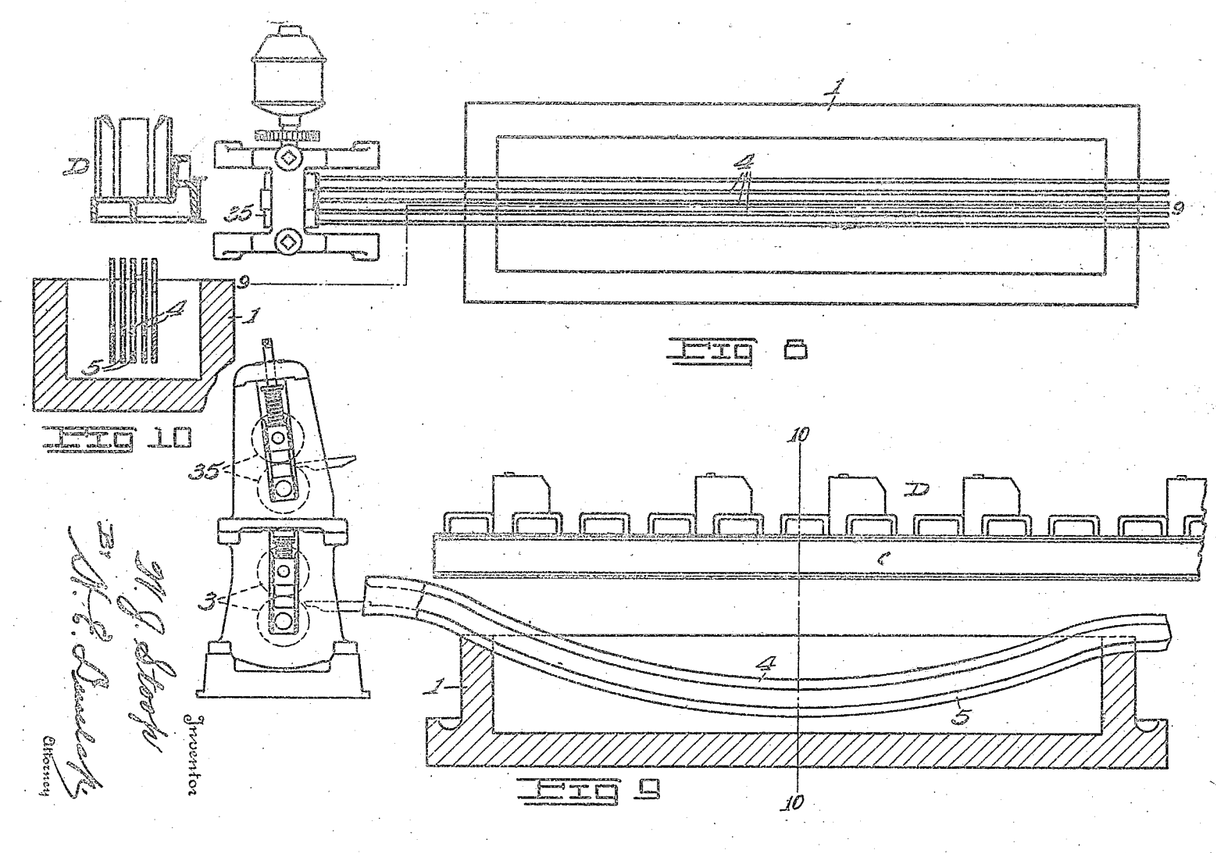
Figure 8 is an enlarged top plan view of the boshing tank, showing the guides therein.
Figure 9 is a longitudinal section on line 9—9, Fig. 8, showing the bar piler located over the boshing tank on an enlarged scale.
Figure 10 is a transverse section on line 10—10, Fig. 9 on a reduced scale.

Referring to said drawings, 1 indicates a boshing tank through which the sheet bars are passed prior to delivery to a cooling bed, designated generally by the reference character A. Located adjacent to the receiving end of the boshing tank is a pair of pinch rolls 3 journaled in suitable housings and designed to feed the sheet bars through said tank. Upper and lower sets of guide bars 4 and 5 are disposed to form an intermediate guideway through which the sheet bars are passed as they are advanced by the pinch rolls 3, said guideway presenting a long sweeping curvature, being inclined downwardly into the tank from a point adjacent to the exit side of said rolls, and thence extending upwardly over the opposite end of said tank to a point adjacent to the entrance side of a pair of pinch rolls 6. Thus the entire length of the sheet bar is caused to be submerged in the tank during its passage to the last mentioned pinch rolls.

In the preferred embodiment of the invention, illustrated more or less diagrammatically in Fig. 1, the bar passes from the pinch rolls 6 between a series of alined sets of leveling or straightening rollers 7 by which it is straightened or flattened and from which it is directed forward to a transfer table B consisting of a series of alined aprons 9.

It will be understood that the bar initially propelled forward through the boshing tank 1 by the pinch rolls 3 is advanced very rapidly and, grasped by the pinch rolls 6, is advanced to the transfer table B over the rapidly driven rollers 7 with sufficient force to carry it wholly upon said table. A suitable spring buffer, as 10, located at the extreme front end of said table is designed to be engaged by the front end of the bar and to relieve the shock incident to the arrest of the forward travel of the bar. Immediately following the coming to rest of the sheet bar on the transfer table, said bar is engaged by one of a plurality of approximately radial horns 11$^a$ of each of a plurality of rotary spider wheels 11 located between adjacent aprons 9 and carried by a shaft 12 which is journaled in bearings beneath said table B, and is by said horns pushed laterally from said table to inclined slide bars 13 upon which the bar slides by gravity to a seat formed at the lower ends of said slide bars, whence said bar is picked up by figures 19 of a plurality of parallel conveyors forming parts of the cooling bed A. Said conveyors comprise endless sprocket chains 14 mounted upon sprocket wheels 15 and 16 carried by rotary shafts 17 and 18 located at the front and rear ends, respectively, of the cooling bed, each of said chains embodying upright fingers 19 located at relatively spaced distances therein, the chains herein shown having each of the links thereof carrying such a finger and made of such a size that a sheet bar may be accommodated in edgewise position intermediate adjacent fingers.

The cooling bed may embody any number of the parallel conveyors required to support the sheet-bars, seven such conveyors being illustrated herein, and said conveyors are made of such length as may be required to effect cooling of the bars in the traverse of the latter from one end of the cooling bed to the other at the maximum rate of speed of said conveyors.

Figure 5:
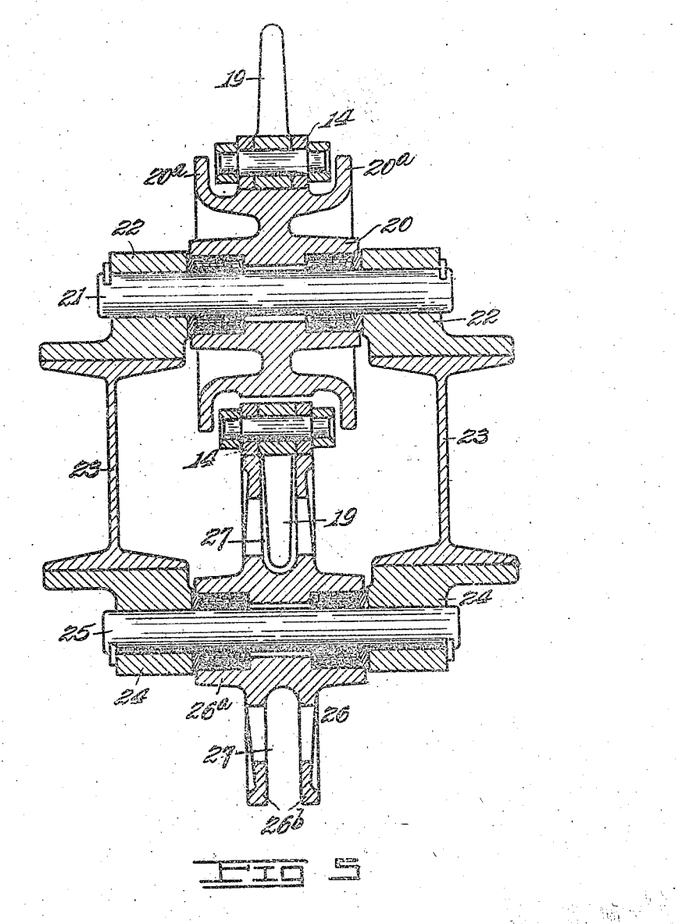
Figure 5 is a section on line 5—5, Fig. 4.

Located in supporting relation to the upper traverse of each of the conveyor chains 14 intermediate the sprocket wheels 15 and 16 is a plurality of idler wheels or pulleys 20 which are rotatable on spindles 21 carried by bearing blocks 22 mounted upon suitably supported parallel I-beams 23 of appropriate length. Also supported on the under sides of said I-beams are blocks 24 in which is carried one or more spindles 25 upon each of which is rotatably mounted an idler wheel or pulley 26 adapted to support the return traverse of the conveyor chain 14. The idler 20 has its peripheral surface shaped in substantial conformity with the approximately plain under surface of the chain which rides thereon and has opposite lateral flanges 20$^a$ between which said chain rides and by which lateral shifting of said chain from the idler is prevented. The idler 26 which as stated, supports the return traverse of the chain is shaped in substantial conformity with the finger-carrying surface of said chain, the same comprising a hub 26$^a$ having two annular disk-portions 26$^b$ upon the peripheries of which the chain rides. Said disk-portions are separated by an intermediate annular channel 27 adapted for the reception of the fingers 19 of said chain.

Figure 7:
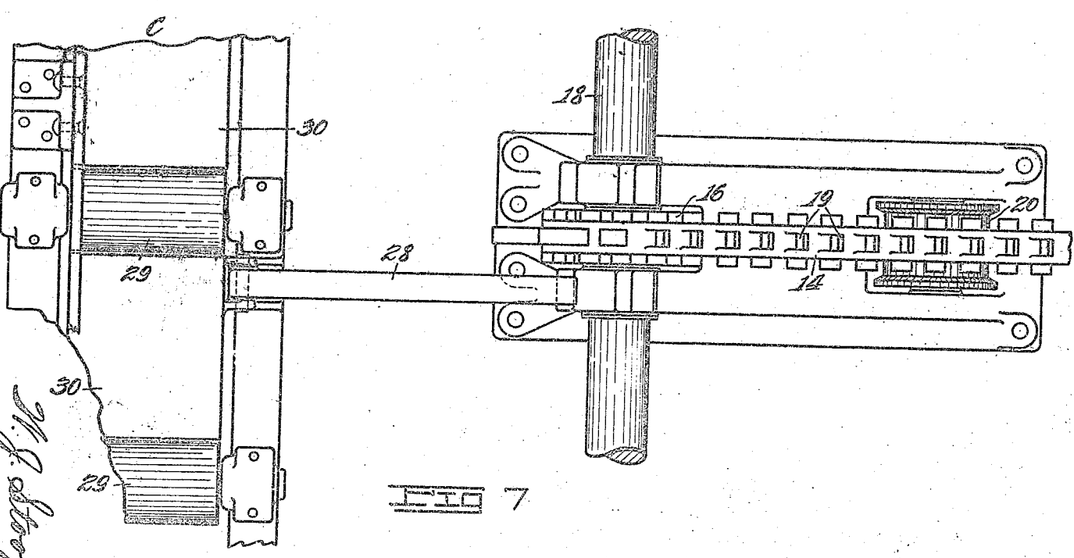
Figure 7 is a top plan view of the same.

Located adjacent to the delivery end of the cooling bed are inclined slide-bars 28 to which the sheet-bars are delivered as the conveyor chains pass over the sprocket wheels 16 and upon which said bars slide by gravity to a carrying-off table C which comprises a series of suitably journaled rollers 29 and apron plates 30, the latter located between adjacent rollers 29, said table C being designed as a conveyor on which the bars are transported to a suitable delivery point.

Figure 11:
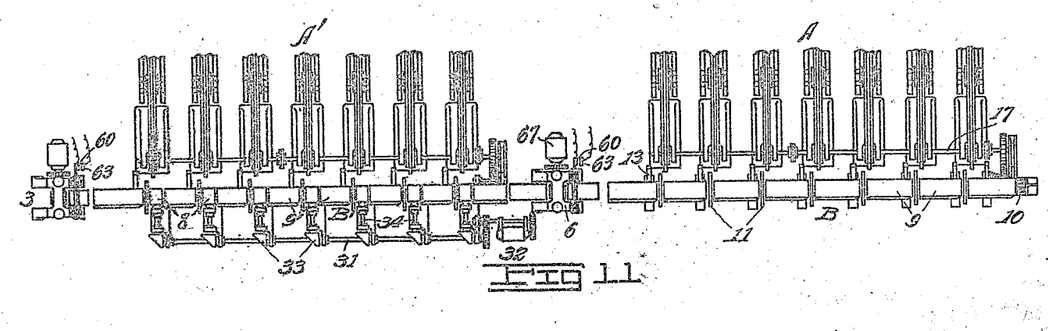
Figure 11 is a partial diagrammatic view in top plan of the invention modified to dispense with the boshing tank and to provide a cooling bed in its place.
Figures 12, 13:
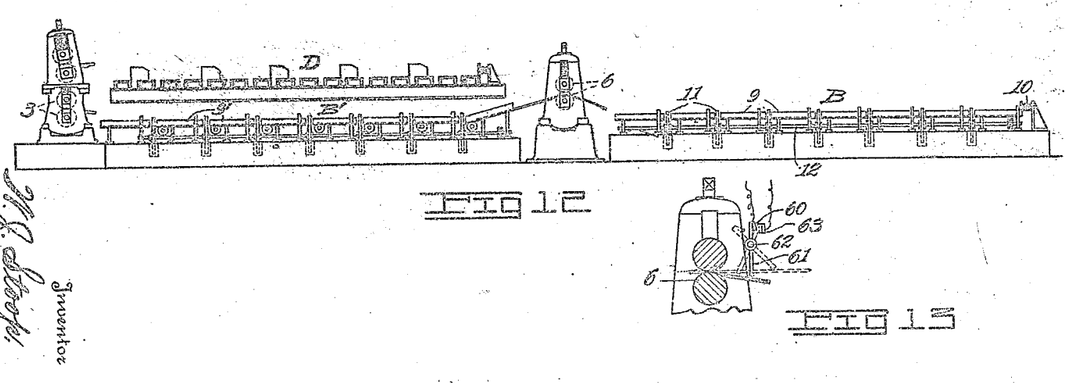
Figure 12 is a front end elevation of the same with a bar piler located over the transfer table of the first cooling bed.
Figure 13 is an enlarged cross section of the pinch rolls equipped with a circuit closer.
Figure 14:
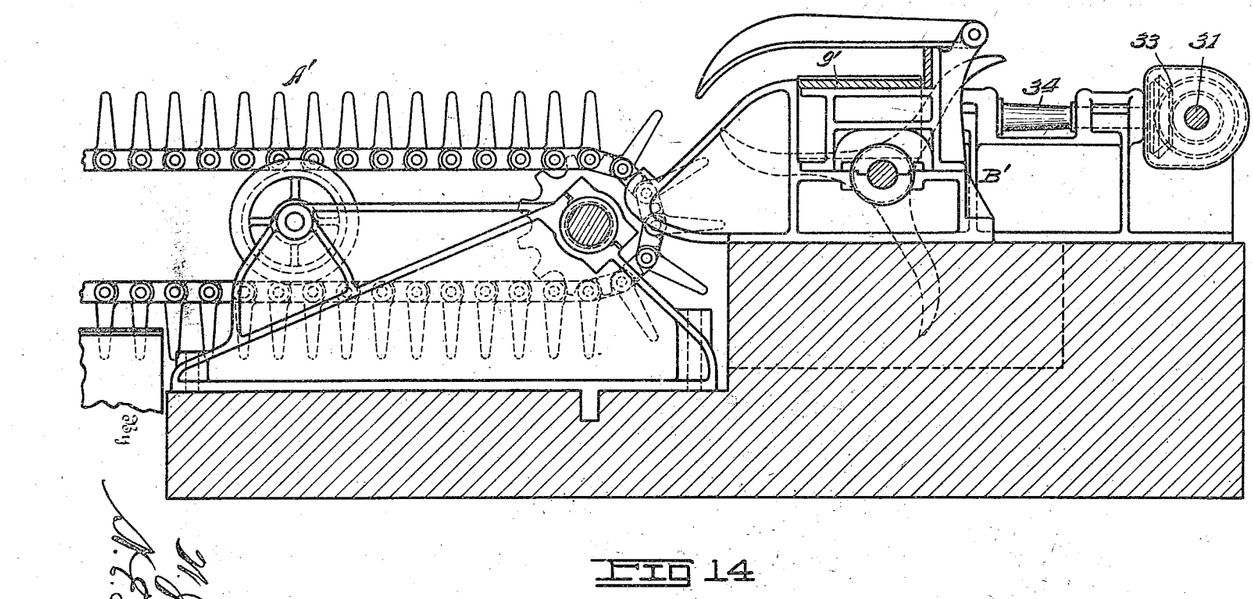
Figure 14 is an enlarged cross section of the transfer table employed in connection with the first of the cooling beds shown in the modification illustrated in Figs. 11 and 12.
Figure 15:
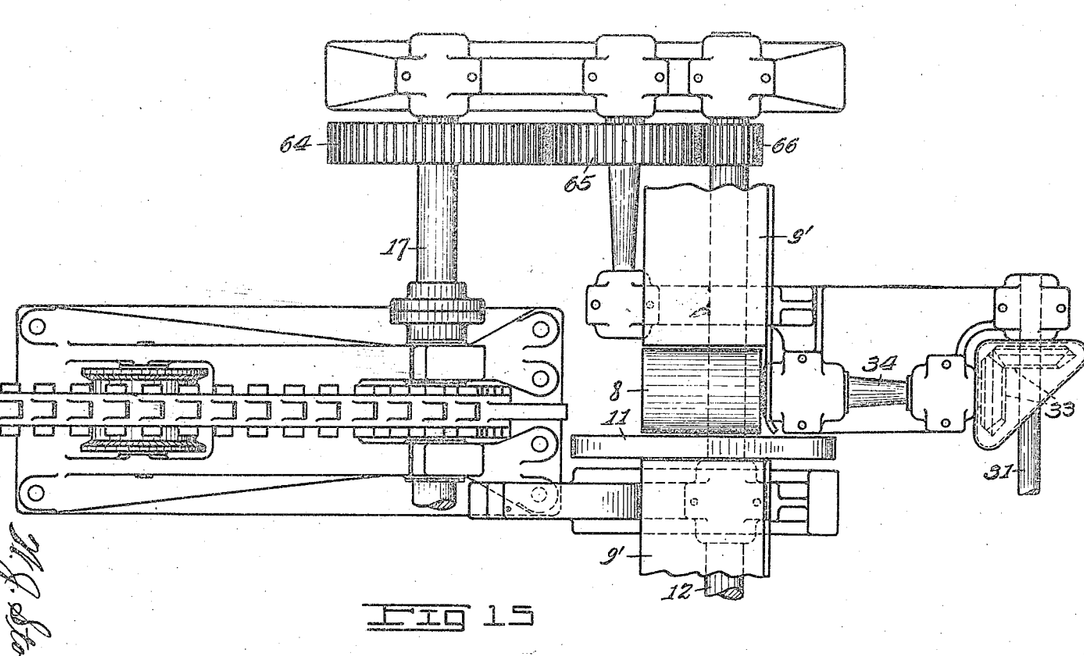
Figure 15 is a fragmentary top plan view of the same illustrating the driving means for the rollers of said table.

In the modification illustrated in Figs. 11 and 12, the boshing tank is dispensed with and two cooling beds A and A' are employed, the transfer table B' for the bed A' being positioned to take the place of said boshing tank and being adapted to receive the sheet-bars directly from the pinch rolls 3. Obviously, the pinch rolls 3 will direct sheet-bars to said transfer table B' for transfer to the cooling bed A' without the provision of any special driving means for the rollers 8 which are interposed between the aprons 9' of said table. Said rollers are, however, provided with driving means whereby they may be actuated to propel forward sheet bars which are to be handled by the cooling bed A, such bars being thereby carried forward to the pinch rolls 6 by which they are then advanced directly to the transfer table B. Said driving means as herein shown comprises a line shaft 31 driven in an appropriate manner, as by an electric motor 32, and bevel gearings 33 located intermediate said line shaft and shafts 34 which are coupled to said rollers 8.

A second set of rolls 35 are preferably carried by the housings in which are journaled the pinch rolls 3, said second set overlying said rolls 3 and being adapted for directing short lengths of sheet bars fed therethrough to a bar piler, generally designated by the reference character D, which is of any ordinary or preferred construction and which is located directly over the boshing tank 1 or over the transfer table B' according as one or the other is employed.

Figure 16:
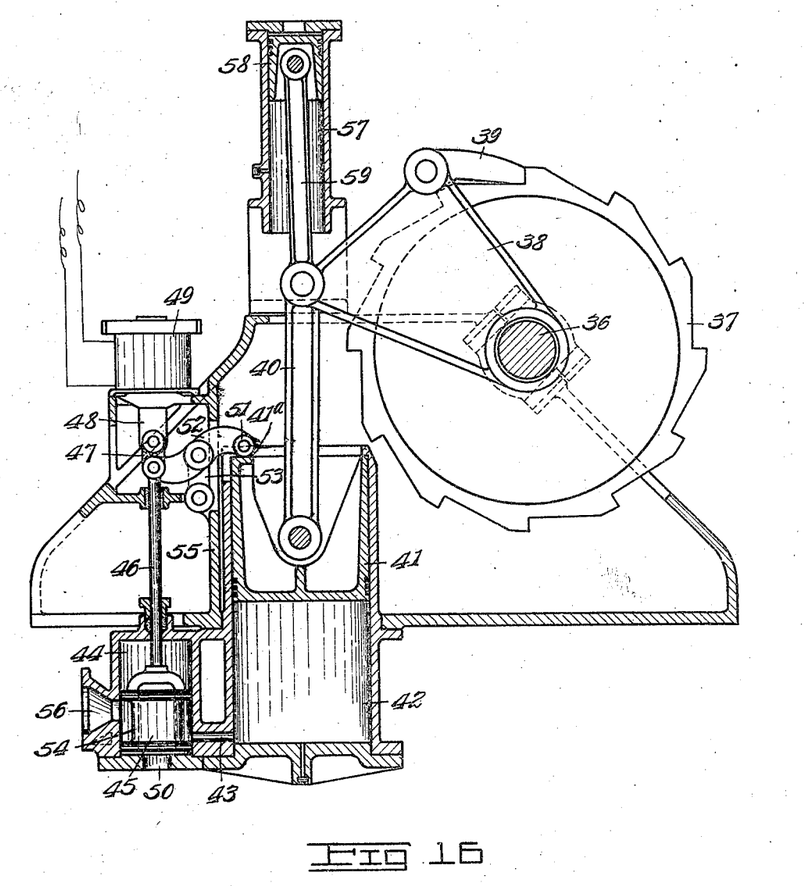
Figure 16 is a central section of the power mechanism by which the conveyors of the cooling beds are intermittently advanced.

The driving means for the conveyors of the cooling bed comprises a power mechanism whereby intermittent rotary movement is imparted to the shaft 18 for advancing the conveyors step by step, and also includes means whereby said power mechanism is actuated by passage of sheet bars to their proper position on the transfer table in readiness to be shifted to the cooling bed.

Said power mechanism comprises a shaft 36 which is suitably coupled, as by a coupling 36ª to the shaft 18 of the cooling bed mechanism and which carries thereon a ratchet wheel 37. Mounted for independent rotary movement upon the shaft 36 adjacent to said ratchet wheel is an arm 38 of approximately triangular form, and pivoted to said arm at the forward outer angle thereof is a pawl 39 which rides upon the periphery of said ratchet wheel and which is adapted to engage with a tooth of the latter for imparting thereto a partial rotation when said arm is actuated to swing forward on said shaft 36. The rear outer angle portion of said arm 38 is pivotally attached to the upper end of a connecting rod 40 which has its lower end pivoted to a piston 41 which is arranged for reciprocation within an upright air, hydraulic, or steam cylinder 42 which has its upper end open. The extreme lower end of said cylinder communicates through a side-opening port 43 with a second, or auxiliary, cylinder 44 in which is disposed a vertically reciprocable piston 45. Said piston 45 is carried on the lower end of a piston rod 46 which extends outward through the upper end of the cylinder 44 and which is connected by a pivoted link 47 to the lower end of the movable core 48 of a suitable electromagnet 49. Said electromagnet is normally maintained deenergized, as will hereinafter be explained, causing said core 48 to occupy its lowered position in which the piston 45 is located at the limit of its downward movement. When, however, said electromagnet is energized, the core 48 is instantly elevated, lifting the piston 45 to a point wherein the port 43 is thereby uncovered. The pressure fluid which enters said cylinder 44 through a port 50 in the lower end of the latter is thus permitted to enter the cylinder 42 for effecting upward reciprocating movement of the piston 41 whereby, through the intermediacy of the connecting rod 40, arm 38, pawl 39 and ratchet 37, a partial rotary movement of the shaft 18 is produced for advancing the conveyor mechanism of the cooling bed throughout a single step of definite length.

As said piston 41 approaches the limit of its upward movement, a seat portion 41ª formed on its upper end engages an antifriction roller 51 carried by the adjacent end of a lever 52 which is pivoted intermediate its ends upon the upper end of a link-like rocker arm 53 that has its lower end mounted upon a fixed part of a suitable frame structure 55 with which the described parts of the driving mechanism are associated. The opposite end of said lever 52 is pivoted to the link 47. Thus, in the final portion of the upward movement of said piston 41, the lever 52 is swung on its mounting whereby the piston 45 is positively thrust downward to its normal seated position, the core 48 of the electromagnet having been previously released through the breaking of the energizing electric circuit in which said electromagnet is located, as will hereinafter be explained. The return of said piston 45 cuts off the entrance to the cylinder 42 of the actuating fluid through the port 43 and opens said port for the exhaust therethrough of the spent fluid, said piston having intermediate its ends a reduced portion or annular channel 54 which provides for free communication around said piston between said port 43 and an exhaust port 56 leading to the atmosphere through the wall of the cylinder 44.

As the spent pressure fluid exhausts from the cylinder 42, the piston 41 is returned to its normal position by pressure fluid admitted to the upper end of a relatively small cylinder 57 which is located in a suitable position above said cylinder 42 and which has operating therein a piston 58 connected by a connecting rod 59 to the upper end of the connecting rod 40. As is manifest, the downward movement of said pistons 41 and 58 effects retraction of the pawl 39 throughout the distance required to position it in engagement with the next tooth of the ratchet 37.

The cylinder 57 is made of such relatively smaller size than the cylinder 42 that, while it suffices to return the piston 41 to its lowered position upon the release or exhaust of the pressure, or motive, fluid from said cylinder 42, the downwardly directed force of the fluid supplied thereto is insufficient to unduly retard upward movement of the piston 41 under the motive force admitted to said cylinder 42.

The electromagnet 49 is located in an electric circuit which includes a circuit closer adapted to momentarily effect closing of the circuit at predetermined times. As shown in Fig. 13 for illustrative purposes, said circuit closer comprises a movable contact 60 carried by the upper end of arm or bar 61 which is pivotally mounted intermediate its ends upon a transverse rod 62 carried by the housings for the last set of pinch rolls employed—that is, the pinch rolls which occupy a position directly adjacent to the front end of the transfer table B; or when the two transfer tables B and B' are employed, as shown in Figs. 11 and 12, a circuit closer is also provided at the exit side of the pinch rolls 3. Said arm 61 normally stands in a vertical position in which its contact 60 is out of engagement with a stationary contact 63 located in advance thereof and also in which its lower end is located in the path of sheet bars as they pass from said pinch rolls. When a sheet bar advances through said rolls, its front end engages the lower end portion of said arm 61 and moves said arm to a rearwardly inclined position in which its said lower end mounts and rides upon said bar. When said arm rides off the rear end of the bar, it swings by gravity in the manner of a pendulum in which it presents the contact 60 thereof in engagement with the fixed contact 63, thereby closing the electric circuit whereby the electromagnet 49 is energized for initiating actuation of the driving means by which the conveyors of the cooling bed are advanced, as aforesaid, and by which the sheet bar just delivered to the transfer table is shifted from the latter to a position in which it may be picked up by fingers of said conveyors. As is obvious, the time of engagement between the contacts 60 and 63 is of extremely limited duration, but such suffices to effect elevation of the piston 45, thereby permitting the motive fluid to actuate the driving mechanism.

Figure 2:
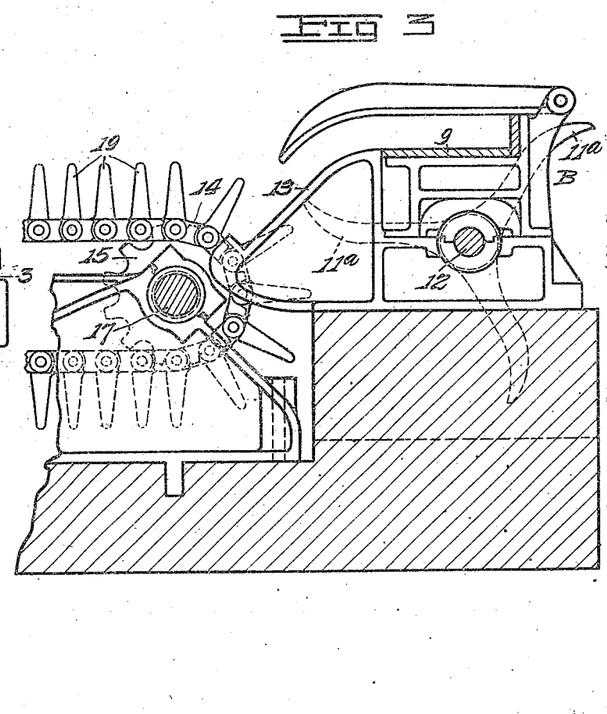
Figure 2 is an enlarged top plan view of a fragmentary portion of the transfer table showing the drive therefor and the adjacent end of one of the conveyor chains of the cooling bed.
Figure 3:
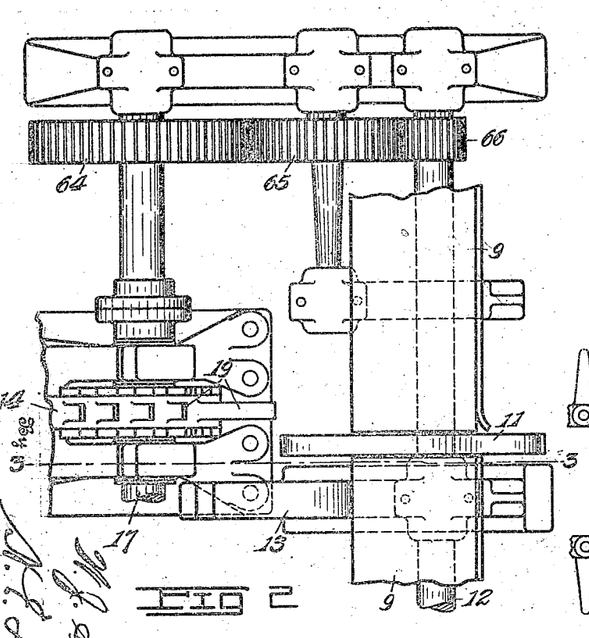
Figure 3 is a sectional elevation of a portion of the structure, said section being taken substantially on line 3—3, Fig. 2.

The shaft 12 by which the spider wheels 11 are carried are driven by suitable gearing interposed between it and the conveyor-carrying shaft 17, and, consequently, said spider wheels are actuated simultaneously with each intermittent advance of the conveyors. Said gearing, as herein shown, comprises a gear 64 carried by an end of said shaft 17 and disposed in mesh with an idle gear 65 which, in turn, is disposed in operative relation to a pinion 66 carried by said shaft 12.

It will be understood that, if desired, a plurality of alined boshing tanks 1 may be employed instead of the single boshing tank as herein shown.

The pinch rolls 6, as also the leveling rolls 7 when the latter are employed, are preferably driven by a variable speed electric motor 67. The speed of this motor may be so regulated that the bars will be positioned upon the transfer table B with great accuracy. This is regarded as a matter of considerable importance, as a too rapid delivery of the bars to said table would result in the forward ends thereof being bent through forcible engagement thereof with the buffer 10.

What is claimed is—

1. A sheet-bar handling mechanism comprising a transfer table, means for delivering sheet-bars in a lengthwise direction to said table, a cooling bed having one end located adjacent to said table, rotating means for shifting bars laterally from said table to said cooling bed, said bed comprising a plurality of parallel traveling endless conveyors, a carrying off table located adjacent to the opposite end of said cooling bed and adapted to receive said bars from the latter and to transport said bars to a piling point, and means for advancing the conveyors of said cooling bed intermittently.

2. A sheet-bar handling mechanism comprising a transfer table, means for delivering sheet-bars in a lengthwise direction to said table, a cooling bed having one end located adjacent to said table, means for shifting bars laterally from said table to said cooling bed, said bed comprising a plurality of parallel traveling endless conveyors, a carrying-off table located adjacent to the opposite end of said cooling bed, and adapted to receive said bars from the latter and to transport said bars to a piling point, and means controlled by delivery of bars to said transfer table whereby the conveyors of said cooling bed are advanced a definite distance.

3. A sheet-bar handling mechanism comprising a transfer table, means for delivering sheet-bars in a lengthwise direction to said table, a cooling bed having one end located adjacent to said table, rotating means for shifting bars laterally from said table to said cooling bed, said bed comprising a plurality of parallel traveling endless conveyors, a carrying-off table located adjacent to the opposite end of said cooling bed and adapted to receive said bars from the latter and to transport said bars to a piling point, a power mechanism for driving the conveyors of said cooling bed, and means for intermittently actuating said power mechanism.

4. A sheet-bar handling mechanism comprising a transfer table, means for delivering sheet-bars in a lengthwise direction to said table, a cooling bed having one end located adjacent to said table, rotating means for shifting bars laterally from said table to said cooling bed, said bed comprising a plurality of parallel traveling endless conveyors, a carrying-off table located adjacent to the opposite end of said cooling bed and adapted to receive said bars from the latter and to transport said bars to a piling point, a power mechanism for intermittently advancing the conveyors of said cooling bed, and means for actuating said power mechanism at definite times.

5. A sheet-bar handling mechanism comprising a transfer table, means for delivering sheet-bars in a lengthwise direction to said table, a cooling bed having one end located adjacent to said table, means for shifting bars laterally from said table to said cooling bed, said bed comprising a plurality of parallel traveling endless conveyors, a carrying-off table located adjacent to the opposite end of said cooling bed and adapted to receive said bars from the latter and to transport said bars to a piling point, a power mechanism for intermittently advancing the conveyors of said cooling bed, and means controlled by delivery of bars to said transfer table whereby said power mechanism is actuated.

6. A sheet-bar handling mechanism comprising a transfer table, means for delivering sheet-bars in a lengthwise direction to said table, a cooling bed having one end located adjacent to said table, rotating means for shifting bars laterally from said table to said cooling bed, said bed comprising a plurality of parallel traveling endless conveyors, a carrying-off table located adjacent to the opposite end of said cooling bed and adapted to receive said bars from the latter and to transport said bars to a piling point, a normally inoperative power mechanism whereby the conveyors of said cooling mechanism are advanced, and means for momentarily rendering said power mechanism operative for driving said conveyors throughout a definite distance.

7. A sheet-bar handling mechanism comprising a transfer table, means for delivering sheet-bars in a lengthwise direction to said table, a cooling bed having one end located adjacent to said table, means for shifting bars laterally from said table to said cooling bed, said bed comprising a plurality of parallel traveling endless conveyors, a carrying-off table located adjacent to the opposite end of said cooling bed and adapted to receive said bars from the latter and to transport said bars to a piling point, a normally inoperative power mechanism whereby the conveyors of said cooling mechanism are advanced, and means controlled by delivery of bars to said transfer table whereby said power mechanism is momentarily rendered operative for advancing said conveyors a definite distance.

8. A sheet-bar handling mechanism comprising a transfer table, means for delivering sheet-bars in a lengthwise direction to said table, a cooling bed having one end located adjacent to said table, means for shifting bars laterally from said table to said cooling bed, said bed comprising a plurality of parallel traveling endless conveyors, a carrying-off table located adjacent to the opposite end of said cooling bed and adapted to receive said bars and transport them to a piling point, a normally inoperative power mechanism whereby the conveyors of said cooling mechanism are advanced, and electrical means for momentarily rendering said power mechanism operative, said means including a normally open electric circuit, and a device actuated by each advancing sheet-bar whereby said circuit is momentarily closed.

9. A sheet-bar handling mechanism comprising a transfer table, means for delivering sheet-bars in a lengthwise direction to said table, a cooling bed having one end located adjacent to said table, spider wheels whereby bars are shifted laterally from said table to said cooling bed, said bed comprising a plurality of parallel traveling endless conveyors, said conveyors embodying means whereby bars delivered thereto are individually segregated, a carrying-off table located adjacent to the opposite end of said cooling bed and adapted to receive said bars successively from the latter and to transport said bars to a piling point, and means for advancing the conveyors of said cooling bed intermittently throughout a definitely limited distance.

10. A sheet-bar handling mechanism comprising a transfer table, means for delivering sheet-bars in a lengthwise direction to said table, a cooling bed having one end located adjacent to said table, rotating means whereby said bars are individually shifted laterally to said cooling bed following delivery to said table, said bed comprising a plurality of parallel traveling endless conveyors having separate relatively spaced bar-receiving spaces, means for intermittently advancing the conveyors of said cooling bed throughout a distance corresponding to the distance between adjacent bar-receiving spaces, and a carrying-off table located adjacent to the opposite end of said cooling bed and adapted to receive said bars from the latter and to transport said bars away from said bed.

11. A sheet-bar handling mechanism comprising a transfer table, means for delivering sheet-bars in a lengthwise direction to said table, a cooling bed having one end located adjacent to said table, spider wheels whereby said bars are individually shifted laterally to said cooling bed following delivery to said table, said bed comprising a plurality of traveling endless conveyors having separate relatively spaced bar-receiving spaces, means for intermittently advancing the conveyors of said cooling bed throughout a distance corresponding to that between adjacent bar-receiving spaces, gearing intermediate said bed and said spider wheels whereby the latter are actuated simultaneously with the advance of said conveyors, and a carrying-off table to which bars are individually delivered from said bed.

12. A sheet-bar handling mechanism comprising a transfer table, means for delivering sheet-bars to said table, a cooling bed having one end located adjacent to said table, devices for effecting shifting of bars from said table to said bed, said bed comprising a plurality of parallel traveling endless conveyors having separate relatively spaced bar-receiving spaces, a normally inoperative power mechanism for advancing said conveyors throughout a definitely limited distance, and electrical means for intermittently rendering said power mechanism operative.

13. A sheet-bar handling mechanism comprising a transfer table, means for delivering sheet-bars to said table, a cooling bed having one end located adjacent to said table, devices for effecting shifting of bars from said table to said bed, said bed comprising a plurality of parallel traveling endless conveyors having separate relatively spaced bar-receiving spaces, a normally inoperative power mechanism for advancing said conveyors throughout a definitely limited distance, and electrical means for intermittently rendering said power mechanism operative, said electrical means including a normally-open electric circuit arranged to be momentarily closed by each sheet bar at a definite point in the advance of the latter.

14. A sheet-bar handling mechanism, as defined in claim 12, in which the power mechanism comprises a ratchet device for imparting a definite advance movement to the conveyors, a main power cylinder, a piston reciprocable in said cylinder and arranged to actuate said ratchet device upon its outstroke, an auxiliary cylinder in communication with an end of said main cylinder, a piston reciprocable in said auxiliary cylinder, means permitting passage of the actuating fluid through said auxiliary cylinder to said main cylinder for producing an outstroke of the main cylinder piston when the piston of said auxiliary cylinder is elevated and permitting exhaust of said fluid from said main cylinder when said auxiliary cylinder piston is lowered, said auxiliary cylinder piston being arranged to be actuated to elevated position by said electrical means, and means for effecting the return of said main cylinder piston to initial position.

15. A sheet-bar handling mechanism comprising pinch rolls, a boshing tank through which sheet bars are directed by said rolls, a cooling bed, means for delivering said bars to said bed following passage thereof through said tank, said bed comprising traveling conveyors embodying means whereby said bars are maintained out of contact with each other, and means for advancing said conveyors.

In testimony whereof, I affix my signature in presence of two subscribing witnesses.

WILLIAM J. STOOP.

Witnesses:
G. O. SMITH,
H. E. DUNLAP.